No. 713,989. Patented Nov. 18, 1902.
A. G. KECK.
CORN SHOCK MOVER.
(Application filed Mar. 27, 1902.)
(No Model.) 2 Sheets—Sheet 1.

Witnesses
Inventor
Adam G. Keck
by Higdon & Longan Attys.

THE NORRIS PETERS CO., PHOTO-LITHO., WASHINGTON, D. C.

No. 713,989. Patented Nov. 18, 1902.
A. G. KECK.
CORN SHOCK MOVER.
(Application filed Mar. 27, 1902.)
(No Model.) 2 Sheets—Sheet 2.
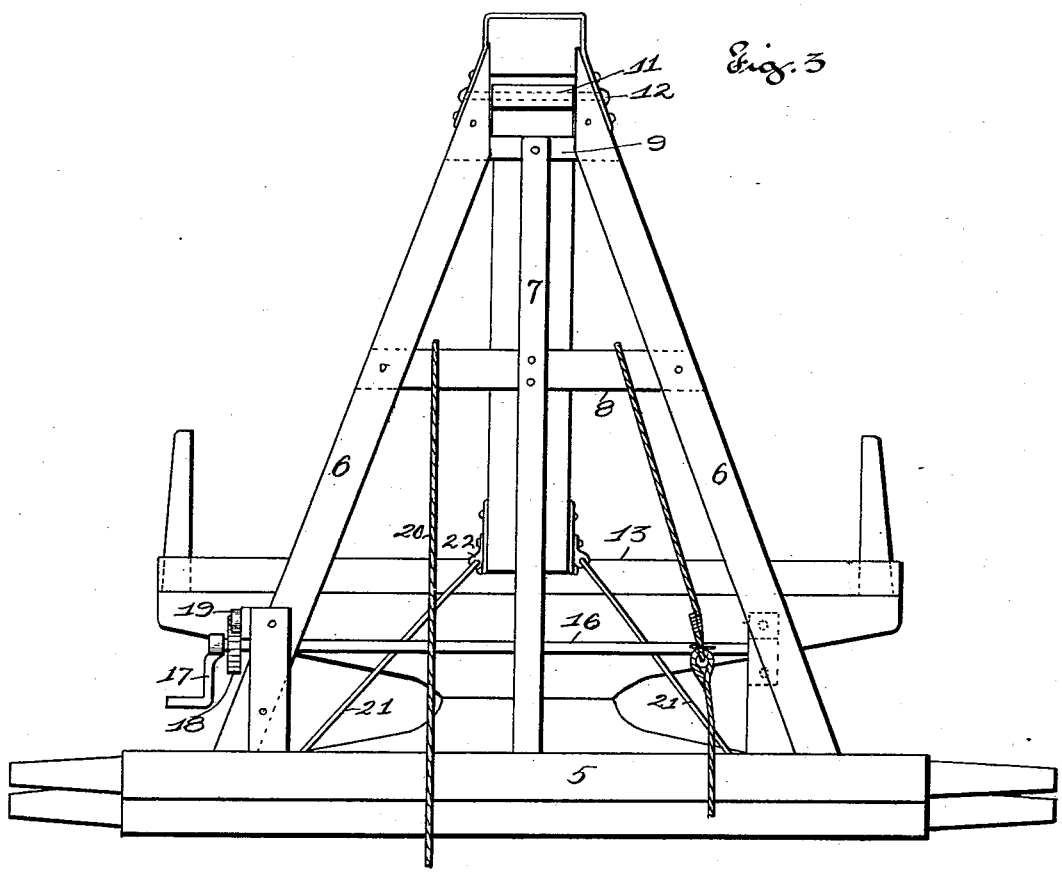
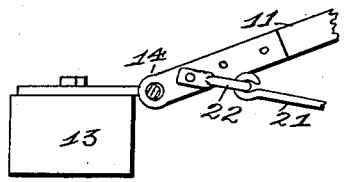

UNITED STATES PATENT OFFICE.

ADAM G. KECK, OF BELLEVILLE, ILLINOIS.

CORN-SHOCK MOVER.

SPECIFICATION forming part of Letters Patent No. 713,989, dated November 18, 1902.

Application filed March 27, 1902. Serial No. 100,202. (No model.)

*To all whom it may concern:*

Be it known that I, ADAM G. KECK, of the city of Belleville, St. Clair county, State of Illinois, have invented certain new and useful Improvements in Corn-Shock Movers, of which the following is a full, clear, and exact description, reference being had to the accompanying drawings, forming a part hereof.

My invention relates to improvements in shock-lifters; and it consists of the novel construction, combination, and arrangement of parts hereinafter shown, described, and claimed.

My object is to make an improved shock-lifter which can be drawn to a standing corn-shock, lift the shock bodily from the ground, transport the shock to a desired spot, and set the shock again upon the ground in a standing position.

My invention consists of a compression-frame mounted upon a two-wheel rear truck, as required to allow the frame to swing from a horizontal to a vertical position, a steering-frame hinged to the forward or upper end of the compression-frame and pivotally supported at its front end by a two-wheel front truck, a windlass mounted upon the compression-frame, a rope attached to the windlass and adapted to extend around the shock and through the compression-frame, so as to compress the shock by operating the windlass, rods connecting the rear truck to the forward truck to hold the compression-frame in its vertical position, a tension-hook connecting said rope to the front truck, so as to further compress the shock by pulling the two trucks apart to raise the shock, a flexible brace or cord connecting the lower part of the front truck to the upper part of the compression-frame to hold the front truck in its normal position, and a lever extending downwardly from the rear end of the steering-frame to engage the ground to swing the compression member upwardly to its vertical position.

Figure 1:
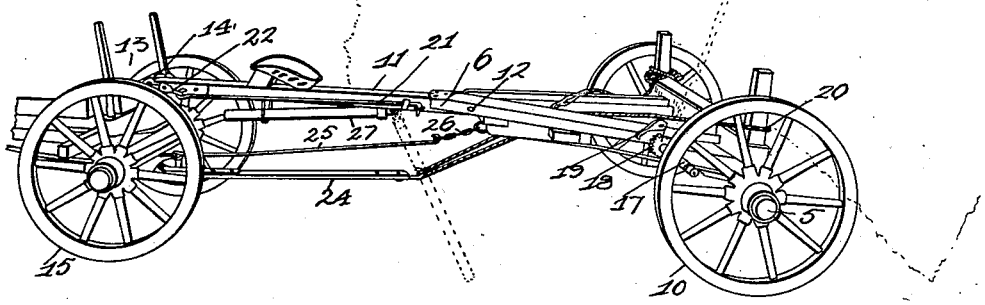
Figure 2:
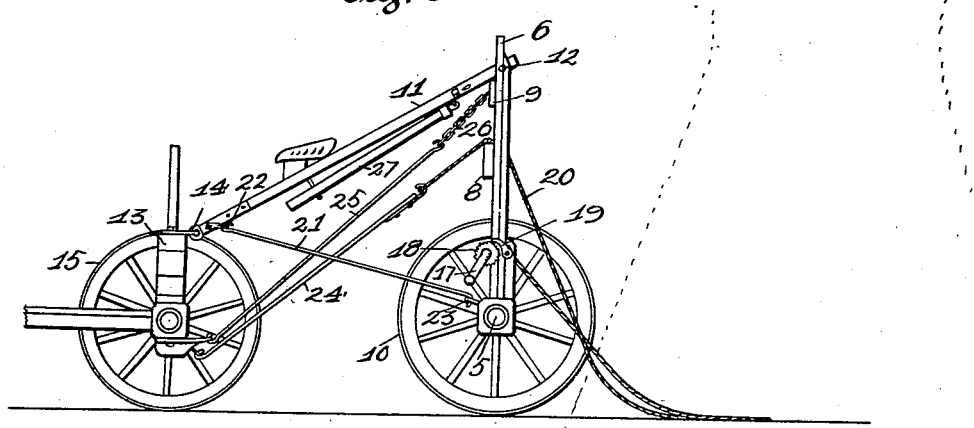

Figure 1 is a view in perspective of a shock-lifter embodying the principles of my invention, the shock being shown in dotted lines ready for transportation. Fig. 2 is a view in elevation of the shock-lifter with the compression-frame in a vertical position ready to receive the shock, the near wheels and other parts being removed from their axles and the removable rods being in position to hold the compression-frame in its vertical position. Fig. 3 is a rear elevation as seen looking in the direction indicated by the arrow in Fig. 2, the wheels being omitted. Fig. 4 is a detail showing the connection between the forward end of the steering-frame and the front truck.

Referring to the drawings in detail, the compression-frame comprises the rear axle 5, the hounds or braces 6, extending forwardly and toward each other from the axle, the false reach 7, extending forwardly from the axle one-half way between the hounds, the cross-piece 8, connecting the hounds and reach at a point intermediate of their ends, and the cross-piece 9, connecting the forward ends. The wheels 10 support the axle 5. The steering-frame comprises the reach 11, having its rear end mounted between the forward ends of the hounds 6 and hinged in position by the bolt 12 and having its forward end pivotally connected to the front truck 13 by the hinge 14. The wheels 15 support the front truck. The rear truck comprises the axle 5 and the wheels 10. The windlass comprises the shaft 16, connected to the hounds 6 near their lower or rear ends, the crank 17 for rotating the shaft, the pawl-wheel 18, fixed upon the shaft, and a pawl 19 to engage the pawl-wheel and to hold the shaft against rotation backwardly. The rope 20 has its ends attached to the windlass 16, and said rope is adapted to be passed through the compression-frame over the cross-piece 8 and around the corn-shock.

The removable rods 21 have hooks in their forward ends to engage the eyes 22, attached to the hinges 14, and said rods have hooks in their rear ends to removably engage the eyes 23, attached to the rear axle. When the rods are in position, as shown in Fig. 2, the compression-frame is held in its vertical position and the trucks may be drawn forwardly or backwardly the same as a wagon, and in this position the trucks may be backed up to a corn-shock, so that the shock may be drawn against the compression member by passing a rope around the shock and operating the windlass. The tension-hook 24 is attached to the lower side of the front axle, and its rear end is substantially in vertical alinement below the hinge between the steering-frame and the compression-frame, as shown in Fig. 1, and the loop of the rope 20 is engaged by the rear end of said hook. The brace 25 is attached to the lower side of the front axle and extends upwardly and is attached to the chain 26, said chain being attached to the forward end of the compression-frame a short distance back of the hinge, the length of said brace being regulated by removing the hook at its rear end from one link of the chain and inserting it in another, as desired. The brace 25 serves to hold the front truck in its vertical position. If the brace was omitted, the truck would be liable to tip forwardly or backwardly. The dumping-lever 27 is hinged to the steering-frame near its rear end, so that when said lever is swung backwardly and allowed to engage the ground and the trucks are backed up the lever will push the steering-frame upwardly, thus throwing the compression-frame to its vertical position, as required to either receive or unload the shock.

In the practical operation of the shock-lifter the trucks are moved to the vicinity of the shock. The dumping-lever is lowered and the trucks backed up to throw the compression-frame to its vertical position, as shown in Fig. 2. The rope is passed around the shock and through the hook 24. The windlass is operated to tighten the rope and compress the shock against the compression-frame. Then the team pulls the front truck away from the rear truck, thus pulling the compression-frame downwardly to its horizontal position. The hook 24, pulling upon the rope 20, further compresses the shock and pulls the shock, along with the compression-frame, to a horizontal position, as shown in Fig. 1. Then the trucks may be hauled to any desired location, the dumping-lever 27 being held up beside the steering-frame, as shown in Fig. 2, during the transportation. Then the dumping-lever is again lowered to engage the ground, the trucks run backwardly, and the dumping-lever pushes the steering-frame upwardly, throwing the compression-frame to its vertical position and setting the corn-shock again on the ground. Then the ropes are released, the rods 21 hooked into position, and the shock-lifter may be transported to another shock without lowering the compression member, thus holding the compression member ready to receive the new shock.

I claim—

1. In a shock-lifter, a compression member mounted upon a rear truck; a steering-frame mounted upon a front truck, the forward end of the compression member being hinged to the rear end of the steering-frame; means of compressing the shock upon the compression member; and a dumping-lever attached to the rear end of the steering-frame and adapted to engage the ground to raise the compression member to its vertical position, substantially as specified.

2. In a shock-lifter, a compression-frame mounted upon a rear truck; a windlass mounted upon the compression-frame; a steering-frame hinged to the front end of the compression-frame; a front truck supporting the steering-frame; and means of swinging the compression-frame up and down upon the axle as required to load and unload the shock, substantially as specified.

3. A corn-shock lifter comprising a compression-frame mounted upon a two-wheeled rear truck as required to allow the frame to swing from a horizontal to a vertical position; a steering-frame hinged to the forward or upper end of the compression-frame, and pivotally supported at its front end by a two-wheeled front truck; a windlass mounted upon the compression-frame; a rope attached to the windlass and adapted to extend around the shock, so as to compress the shock against the compression-frame; and a dumping-lever extending downwardly from near the point between the compression-frame and the steering-frame, and adapted to engage the ground as required to elevate the compression-frame to receive or unload the shock, substantially as specified.

4. A shock-lifter comprising a compression-frame mounted upon a two-wheeled rear truck as required to allow the frame to swing from a horizontal to a vertical position; a steering-frame hinged to the forward or upper end of the compression-frame and pivotally supported at its front end by a two-wheeled front truck; a windlass mounted upon the compression-frame; a rope attached to the windlass, and adapted to extend around the shock and through the compression-frame, so as to compress the shock by operating the windlass; rods connecting the rear truck to the forward truck to hold the compression-frame in its vertical position; a tension-hook connecting said rope to the front truck so as to further compress the shock by pulling the two trucks apart to raise the shock; a flexible brace or cord connecting the lower part of the front truck to the upper part of the compression-frame to hold the front truck in its normal position; and a lever extending downwardly from the rear end of the steering-frame to engage the ground to swing the compression member upwardly to its vertical position, substantially as specified.

In testimony whereof I affix my signature in presence of two witnesses.

ADAM G. KECK.

Witnesses:
MARSHALL W. WEIR,
BEN LANTZ.